May 23, 1944.　　　　　S. KHALIL　　　　　2,349,554
TYPEWRITER AND THE LIKE
Filed May 26, 1942　　　5 Sheets-Sheet 1

INVENTOR
SEYED KHALIL
BY
ATTORNEYS

May 23, 1944. S. KHALIL 2,349,554
TYPEWRITER AND THE LIKE
Filed May 26, 1942 5 Sheets-Sheet 4

INVENTOR
SEYED KHALIL.
BY
ATTORNEYS

May 23, 1944.   S. KHALIL   2,349,554
TYPEWRITER AND THE LIKE
Filed May 26, 1942   5 Sheets-Sheet 5

INVENTOR
SEYED KHALIL
BY Van Deventer & Grier
ATTORNEYS

Patented May 23, 1944

2,349,554

UNITED STATES PATENT OFFICE 2,349,554

TYPEWRITER AND THE LIKE

Seyed Khalil, New York, N. Y.

Application May 26, 1942, Serial No. 444,531

19 Claims. (Cl. 197—84)

This invention relates to improvements in typewriters and the like, and is directed more particularly to line justifying mechanisms therefor.

The principal object of the invention is the provision in a typewriter, or the like, of a continuously variable pitch rack bodily movable with and adjustably movable on the carriage, a pinion associated with the escapement of said typewriter and meshing with said rack, and means for moving said rack to various pitch relations with respect to said pinion.

Another object of the invention is the provision, in a typewriter or the like, of a continuously variable pitch rack and a pinion capable of meshing with all pitches of said rack, said rack and pinion being connected between said carriage and the escapement of said typewriter.

A further object of the invention is the provision, in a typewriter or the like, of a continuously variable pitch rack cylindrically formed and rotatably movable on the carriage of said typewriter, a pinion permanently meshing with said rack and connected to the escapement mechanism of said typewriter, means for locking said rack against rotation, and means for disabling said locking means and rotating said rack to any other desired position.

Yet another object of the invention is the provision, in a typewriter or the like, of a continuous variable pitch rack carried on the carriage of said typewriter, a pinion permanently meshing with said rack and connected to the escapement of said typewriter, means for moving said rack longitudinally on said carriage in accordance with the position chosen for the initial typing point, and means for adjusting said rack laterally on said carriage to change its pitch relation to said pinion.

Another object of the invention is the provision, in a typewriter or the like, of a continuously variable pitch rack cylindrically formed and rotatably movable on the carriage of said typewriter, a pinion permanently meshing with said rack and connected to the escapement of said typewriter, and means on said carriage for rotating said rack for increasing or decreasing the typing intervals, said means including a visual indicator and means for securing said rack in any set position.

Other objects and advantages of the invention will be apparent to those skilled in the art.

One of the important features of the invention is the provision of a single unitary rack which in fact performs the functions of a number of racks of different pitches, whether the latter are secured together side by side or end to end, or combinations thereof.

Some of the advantages of my new continuously variable pitch rack over a plurality of conventional racks of different pitches are:

(a) To obtain the total variation which my rack provides, would require an unreasonable amount of space for the conventional racks and pinions cooperating therewith.

(b) With my rack the typing may begin at any position of the platen and maintain a left-hand margin alignment as perfect as is at present obtained with a single conventional rack. In devices provided with a plurality of combined racks, this is not the case.

(c) With my rack, the typing may end at any position of the platen and maintain a right-hand margin alignment as perfect as the left-hand marginal alignment, which is not the case with a plurality of combined racks.

(d) With my rack, the justification of any and all lines is effected by means of a simple setting of visual indicators.

(e) Due to the fact that the teeth of my rack are continuous, angularly disposed and are of substantial length, they are strong enough, even though the narrow ends are made exceedingly thin, to enable the accomplishment of a great percentage of enlargement and reduction with the use of a single pinion. This is impossible with devices employing a plurality of combined racks.

In order to give a clear understanding of the use of my new and improved continuous variable pitch rack, the following explanation is given:

Next to a typed line comprising, for example, 60 type intervals of 10 pitch (10 to the inch), it is desired to type a line comprising 59 type intervals and have each end of this line in line with the ends of the line which includes 60 typing intervals. In other words, the 59 typing intervals will have to be increased so that they add up to the length of the 60 typing intervals referred to. A visual indicator on my machine would be set to a position indicated by "increase 1." This setting would be effected at the end of the 60 type line, and when the carriage is returned and the 59 typing intervals are applied to the platen, they have been increased to the extent that they occupy the same length as the 60 type line.

In determining the characteristics of the rack, certain factors such as its length, its diameter, etc., should be taken into consideration in order to ascertain the angle of the last tooth. It will be noted from the drawings that the inclination of the teeth increases toward the right.

As an illustration of this, the following will be noted:

(1) A median line along the center of the rack (for instance longitudinal), across the teeth may be considered the normal position, and the pitch of the teeth along said line may be considered to be standard.

(2) The standard pitch, for example, may be taken as 10 to the inch.

(3) The narrowest pitch of the rack may be taken as 11 to the inch, and the widest pitch may, for example, be taken as 9 to the inch. Due to the fact that the functions of the rack at its narrowest pitch is just opposite to that of its widest pitch, the characteristics and functions of the widest pitch need only be described herein.

(4) If 9 type intervals are adapted to occupy the length of 10 type intervals, each of these 9 type intervals must be increased one-ninth $$(\tfrac{1}{9}) - (9 \times \tfrac{1}{9} = 1)$$

(5) The rack, which in its preferred form is cylindrical, has a plurality of teeth which are the webs between a plurality of slots which extend uninterruptedly from a given longitudinal line, around the surface of the cylinder to a second given line adjacent to said first line, the variation of the pitch of the rack is continuous and the rack may be rotated to change from one pitch to another.

(6) Due to the fact that all of the teeth of the rack converge toward a straight line and diverge toward another straight line parallel to the first straight line, the teeth will have an identical and uniform pitch along any straight line parallel to the two straight lines mentioned, or, that is to say, parallel to the axis of the rack.

(7) Since the rack has a uniform pitch along any straight line parallel to its axis, and due to the fact that the pinion engages the rack only along one such lines, it is obvious that by changing the position of the rack with respect to the line of contact with the pinion, the pitch of the rack may be varied at will to any pitch within the capacity of the rack.

(8) Where the rack is made in the form of a cylinder (and this is my preferred form for it), the change from one pitch to another is effected by rotating the rack an appropriate degree, and since the teeth in the rack are angular, any degree of turning the rack will shift the engaging position thereof, as compared with a given line perpendicular with the axis of the rack, therefore in order to maintain said engaging position with said perpendicular line, the rack is also shifted laterally while it is being turned to a new pitch position. Thus, to set the rack from one pitch to another pitch, it must undergo two distinct movements, namely, a rotary movement and a lateral movement.

ROTARY MOVEMENT OF RACK

The rotary movement of the rack is effected manually, and the factors effecting the degrees of rotation are the number of typing intervals in the longest line; and the number of typing intervals to be added to or reduced from said longest line.

LATERAL MOVEMENT OF RACK

In the preferred process of a line justification, my rack remains in operative contact with the tooth of its pinion while the rotary movement is imparted thereon. This engagement enables my rack to automatically move laterally due to two factors:

(a) The degrees of rotation of rack; and
(b) The angle of the tooth of the rack which operatively engages the pinion.

The lateral displacement of the rack is always unitary. In justifying each line, the rack shifts laterally as many units as there are typing intervals to be included in the new line, regardless of whether the number of intervals is to be increased or decreased. The following examples are given so that an understanding of the lateral movement may be had:

The normal pitch line is a mid-line crossing all the rack teeth, so that as the rack is turned in one direction, the pitch increases, and as the rack is moved in the opposite direction, the pitch decreases.

*Example 1.*—Suppose the first tooth at the left end of the rack is engaged with the pinion on the normal pitch line and the rack is turned to the position of greatest diversion of the tooth,— that is to say, to its largest pitch—, the angle of said first tooth will cause the rack to shift toward the left a distance equal to $\tfrac{1}{9}$ of the normal pitch. Assuming that the normal pitch is .100", the lateral displacement of the rack toward the left will be approximately .011".

The above example may not actually be used in line justification, for in any line justification the typing interval to be increased or decreased must be unitary, and not fractional, and $\tfrac{1}{9}$ or .011" as given in said example is fractional. However, this example does serve to explain the lateral movement of the rack to the left, which actually causes the typing intervals to increase toward the right to justify the line.

*Example 2.*—When the tenth tooth from the left is engaged by the pinion (on the normal pitch line), and the rack is turned to the largest end of said tenth tooth, the lateral displacement of the rack will be $$10 \times \tfrac{1}{9} = 1\tfrac{1}{9}$$

that is, one unit of the normal pitch plus $\tfrac{1}{9}$ thereof. This $1\tfrac{1}{9}$ is one unit of lateral displacement. Thus it can be seen that by turning the rack to bring the largest pitch into engagement with the pinion, the units of lateral displacement are $\tfrac{1}{9}$ larger than the normal displacement units.

As the rack is shifted to the left, one unit of lateral displacement, the extreme diverging end of the tenth tooth remains in engagement with the pinion, the diverging end of the second tooth of the rack from the left will, when the carriage is returned to begin the new line of typing, reach the normal position previously occupied by the first tooth, thus insuring alignment of the typing at both ends thereof. The rack in the new position will have a pitch of 9 to the inch; that is, 9 typing intervals will be equal to the length of 10 typing intervals along the normal pitch line.

*Example 3.*—When the 20th tooth from the left is engaged at the normal pitch line by the pinion, and the rack is turned midway between the normal pitch and the largest pitch, the lateral displacement of the rack will be $$20 \times \tfrac{1}{18} = 1\tfrac{1}{9}$$

which corresponds to one unit of lateral displacement.

*Example 4.*—With the 20th tooth from the left engaging the pinion, and the rack is turned to the extreme position of its largest pitch, its lateral displacement will be equal to $$20 \times \tfrac{1}{10} = 2\tfrac{0}{10}$$

or two units of lateral displacement, and so on.

LATERAL DIAL

The divisions of the lateral dial are each an integral unit. Each unit corresponds to a unit of said normal pitch plus the difference between the length of the normal pitch with the extreme end thereof, which is in this case ⅒. That is, the intervals between the divisions of said dial are each equal to 1 and ⅒ of the normal pitch.

These divisions are used as a guide for turning the rack to the exact required degrees. That is, the rack is to be turned until the required division is registered by the indicator.

Each division indicates one typing interval to be enlarged or reduced.

MARGINAL ALIGNMENT

The changing of the pitch of the rack to increase or decrease the typing intervals, such, for instance, as increasing 9 typing intervals to equal the length of 10 typing intervals, has been described. However, means for effecting marginal alignment is another important feature of the invention. The term "marginal alignment" means having the left ends and the right ends of several lines coincide with two vertical lines common to all of them.

To obtain marginal alignment, it is necessary to:

(1) Set the left-hand marginal stop at division "1" of marginal rack;

(2) If a wider margin is desired, set said marginal stop at the required position of the marginal rack and in this case set the variable pitch rack to a division corresponding with the setting of the marginal rack;

(3) Set the right-hand marginal stop at the end of the largest line (as is usually in typing), and before turning the rack, set said stop against the stationary stop. This will cause the proper tooth of the rack to automatically engage the pinion.

These settings are made initially, and thereafter the changing of the magnitude of the typing intervals to justify the lines is done at the end of each line, with the result that perfect marginal alignment at both the right and left ends of the lines is obtained automatically.

Referring to the drawings.

Figures 1, 7:
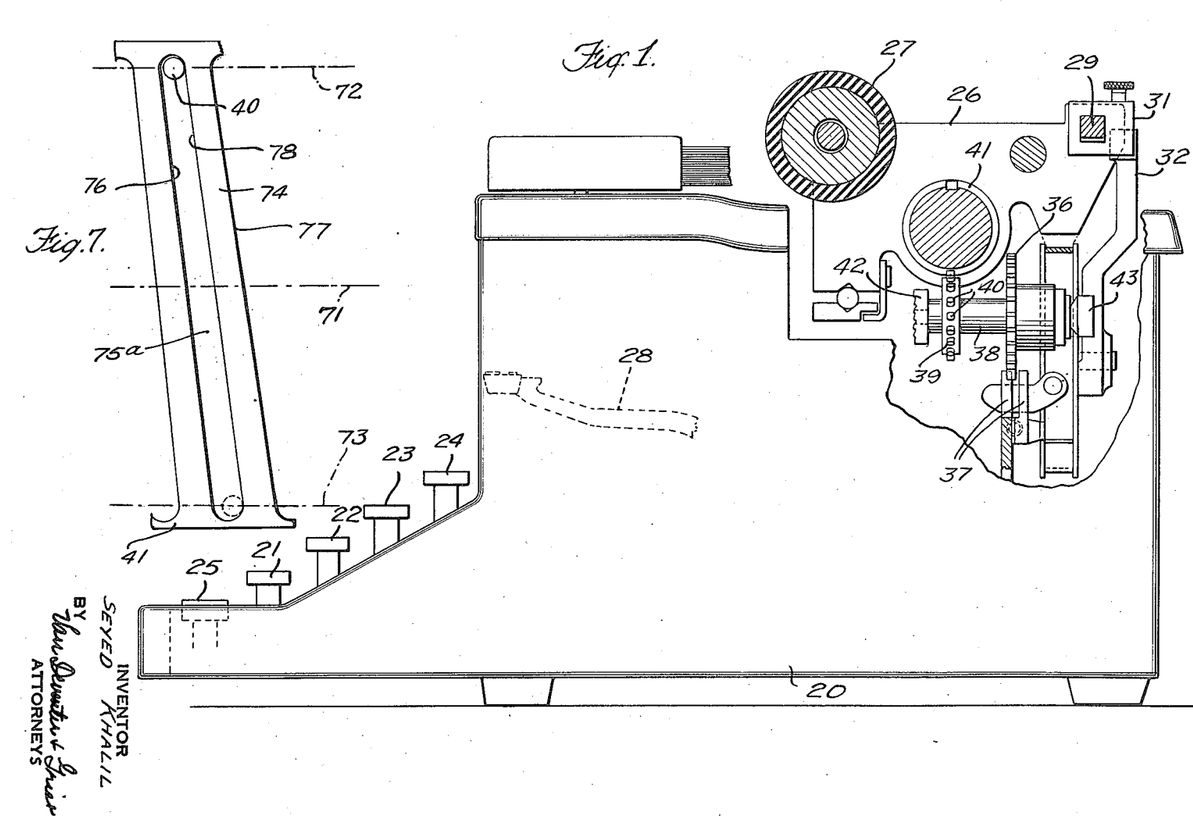
Figure 1 is an elevation of a typewriter provided with my new and improved continuously variable pitch rack.
Figure 7 is a fragmentary view of a development of a portion of the new and improved constantly variable pitch rack showing how the pinion meshes with the rack along various pitch lines.

Referring to Figure 1, the typewriter generally designated by the numeral 20 is provided with rows of keys 21, 22, 23, 24, and a space bar 25. The carriage 26 carries the usual platen 27, and the type bars 28 are actuated by the keys.

Other well known details of the typewriter per se which form no part of the present invention need not herein be described in detail except in so far as to give an understanding of the new and novel features of the invention.

A rack 29 on the carriage carries a graduated scale and is provided with a left marginal stop 30 and a right marginal stop 31. These marginal stops are settable along said scale, and adapted to be engaged by an engaging member 32.

The typewriter is also provided with the usual spring drum 33 having a tape 34 extending therefrom and connected to the carriage at the point indicated by the numeral 35. This spring always urges the carriage toward the left, as is usual in all typewriters.

The typewriter is also provided with the usual escapement wheel 36 and has the usual escapement mechanism generally designated by the numeral 37 cooperating therewith. Since the action of the escapement is old and well known in the art, it need not herein be described in detail.

The escapement wheel 36 is carried on a shaft 38 which is suitably mounted on the frame of the typewriter in bearings 42 and 43. This shaft carries a pinion 39 which is a special pinion wherein the teeth 40 are preferably rounded, instead of being the usual cycloidal or involute form. The reason for this will presently be described in connection with the description of the new and improved continuously variable pitch rack 41 with which this pinion cooperates.

The rack 41 is in the form of a drum or cylinder, and is mounted on the carriage so that it may be rotated about its axis and/or moved longitudinally on said carriage.

The rack is rotatively supported on the carriage in bearings 44 and 45. The following arrangement governs the movement of the rack longitudinally: The rack 41 has a longitudinal slot 46 formed therein, and at the bottom of this slot are formed a plurality of locating holes, three of which are shown and designated by the numerals 47, 48, and 49. A tubular member 50 has a portion 51 of reduced diameter upon which a ring member 52 forms a working fit. (See Fig. 6.) This ring member will presently be described.

Figures 4, 5, 6, 13:
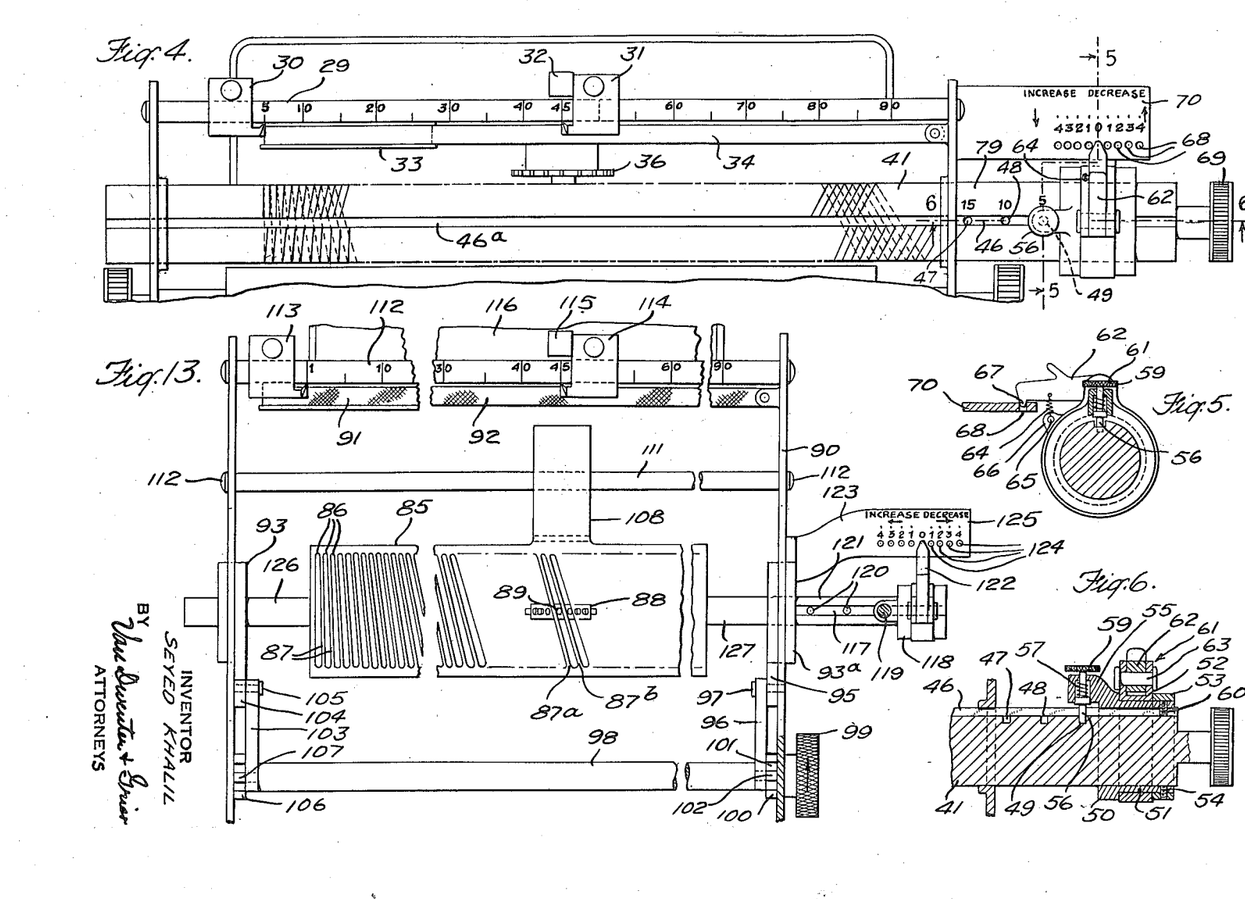
Figure 4 is a fragmentary view similar to a portion of Figure 2, showing the right and left hand marginal stops set to different positions and showing the marginal indicator set to correspond to the settings of the left marginal stop.
Figure 5 is an elevation, partly in section, taken along the line 5—5 of Figure 4.
Figure 6 is an elevation, partly in section, taken along the line 6—6 of Figure 4.
Figure 13 is a plan view of a modification of the arrangement shown in Figures 1 and 2, wherein the rack is in the form of a flat plate instead of a cylinder.

A retaining ring 53 is suitably keyed or otherwise fixed to the portion 51, for example, by means of a pin 54, for retaining the ring member 52 thereon. The tubular member 50 has an overhanging projection 55 which carries a plunger 56. The plunger 56 is spring loaded downwardly by a spring 57 bearing against the collar 58. The plunger 56 is adapted to engage any of the holes 47, 48, and 49, above described, in accordance with certain sittings to be presently described, and by means of a knob 59 the plunger may be disengaged from any hole with which it is engaged.

The tubular member 50 carries an inwardly extending key 60 which forms a working fit with the edges of the slot 46, and permits the rack 41 to be moved endwise, as viewed in Figure 6, in order to enable the plunger 56 to engage any of the holes 47, 48 and 49 desired.

The ring member 52, as may be seen in Figures 5 and 6, has a bossed portion 61 having a slot formed therein to fit the width of a lever 62, and a suitable pivot pin 63 passing through the boss 61 forms a bearing for the lever 62.

A spring 64 has one end thereof secured to the lever 62, and the other end secured to a pin 65 carried on a boss 66 formed integral with the ring member 52. The lever 62 has its extremity tapered, as shown, and carries a downwardly projecting stud 67 which is adapted to engage holes 68 formed in the visual indicator plate 70.

The rack 41 has a suitable knob 69 connected thereto by means of which the rack may be rotated, as will hereinafter be described.

THE RACK AND ITS PINION

Figures 8, 9, 10, 15, 16:
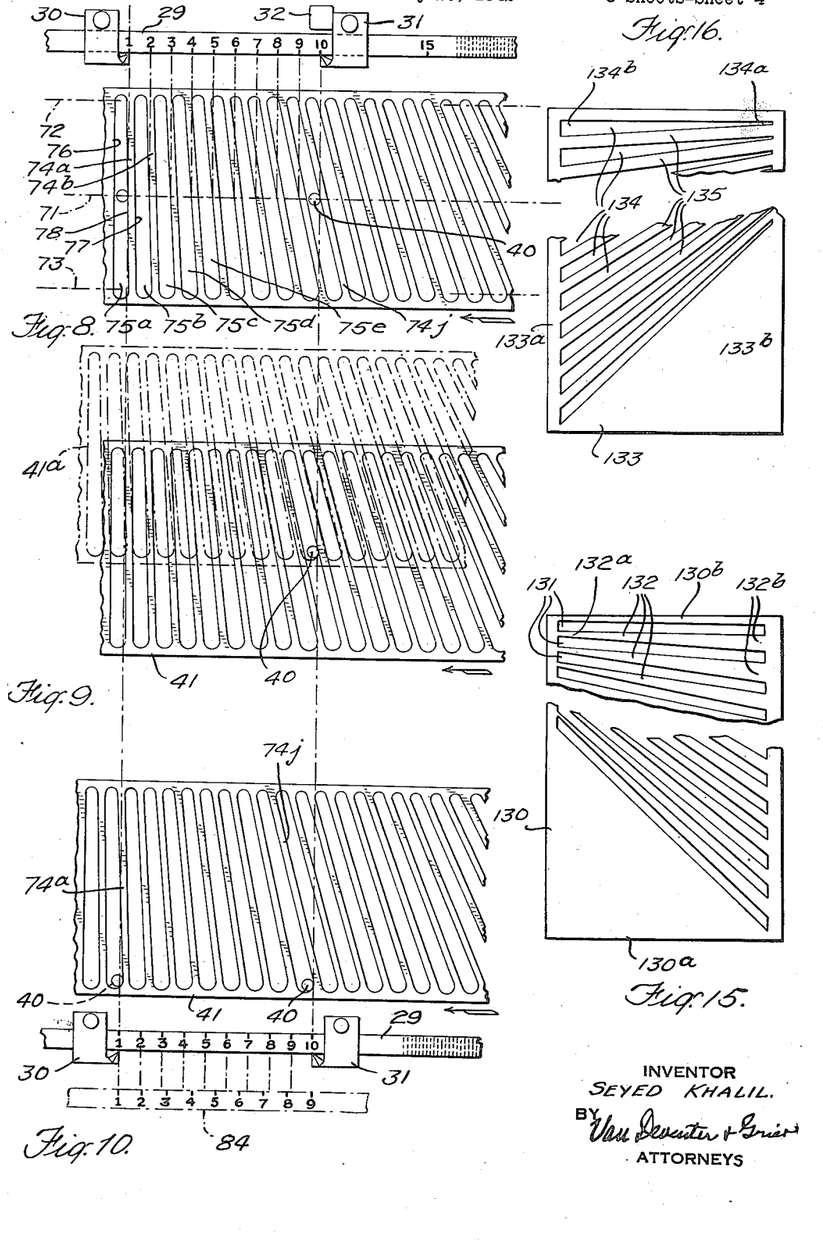
Figure 8 is a fragmentary view of the development of the rack showing the engagement with a pinion tooth along the normal pitch line, which in the example given is 10 pitch.
Figure 9 is a view showing the movement of the rack when shifted from the normal pitch line to the 9 pitch line.
Figure 10 shows the rack engaged by the pinion teeth along the 9 pitch line and includes a scale showing the increased length of the typing intervals effected by this movement.
Figure 15 is a fragmentary view of a development of a variable pitch pinion.
Figure 16 is a fragmentary view of a development of a variable pitch rack adapted to mesh with the pinion shown in Figure 15.

My new variable pitch rack consists in the main in a series of slots, the inclination of each being angular with respect to its neighbors, the angle increasing, for example, toward the right. The webs between these slots form the teeth of the rack. For example, consider Figure 8 as a view showing the circumference of the rack 41 laid out flat, and the development of the teeth of the rack effected is as follows:

The teeth along the normal pitch line 71 may be considered to have a pitch of 10 teeth to the inch; the teeth along the pitch line 72 may be considered to have a pitch of 11 teeth to the inch; and along the pitch line 73 the teeth may be considered to have a pitch of 9 teeth to the inch.

The slots 75ª, 75ᵇ, 75ᶜ, 75d, 75ᵉ, etc., are formed in the material of which the rack is made, and the webs 74ª, 74ᵇ, 74ᶜ, 74ᵈ, 74ᵉ, etc., therebetween form the teeth. The edge 76 of the slot 75ª is at substantially right angles to the pitch lines 71, 72 and 73.

The edge 77 of the slot 75ᵇ is angular with respect to the edge 76 to the extent proportionately of the difference between the spacing on the "eleven" pitch line 72 and the "nine" pitch line 73. The web 74ª between the slots 75ª and 75ᵇ is preferably of a uniform width, therefore the edge 78 of the slot 75ª is substantially parallel to the edge 77 of the slot 75ᵇ. By the same token, the edges of the web 74ᵇ are substantially parallel to each other and form adjacent edges of the slots 75ᵇ and 75ᶜ, etc. It will be noted that the angle of inclination of the slots increase to the right, as viewed in Figure 8.

In view of the fact that the main spring of the typewriter urges the carriage to the left, as viewed in Figure 8, the right-hand edges of all of the slots, or that is to say, the left-hand edges of all of the webs forming the teeth of the rack are urged into engagement with the teeth of the pinion.

The teeth 40 of the pinion are so formed that they mesh with the teeth of the rack along the "eleven" pitch line 72 with sufficient clearance. Obviously, when the teeth of the rack engage the pinion teeth along the normal pitch line 71, which is "ten" to the inch in the example given, these teeth successively engage the left edges or faces of the webs 74ª, 74ᵇ, etc., and therefore the clearance, which in this position is greater than when in the "eleven" position, or this slack has no bearing whatever on the operation of the device.

Likewise, when the rack is moved to a point where the rack teeth engage the pinion teeth along the "nine" pitch line 73, the left faces, such as the face 78 of the rack teeth, successively engage the teeth of the pinion and the clearance between the pinion teeth and the faces, such as the face 76 of the slots, still has no effect whatever on the operation of the device. In other words, by making the teeth of the pinion to mesh with the highest pitch of which the rack is capable, enables the pinion to be used with all portions of the rack, including the portions lying on the smallest or coarsest pitch line.

The above may be perhaps more clearly seen in Figure 7, wherein a fragmentary view of a portion of the development of the rack 41 is shown as greatly enlarged. It will be noted that the teeth 40 on the "eleven" pitch line 72 is held against the left face 78 of the web 74 due to the urge of the main spring drum of the typewriter (designated by the numeral 33 in Figure 2).

There is sufficient clearance between the trailing portion of the tooth 40 and the edge 76 of the slot 75ª. Now, when the rack is moved to a point where the tooth 40 of the pinion 39 engages the rack along the "ten" or normal pitch line 71, there is a little greater clearance between the trailing portion of the tooth 40 and the edge 76 due to the fact that the width of the slot 75ª increases downwardly. However, the tooth 74ª of the rack is held against the leading portion of the tooth 40 due to the action of the main spring.

Likewise, when the rack is turned to the "nine" pitch line 73, the leading portion of the tooth is held in engagement with the rack tooth 74ª (or any other rack tooth with which it is engaged), due to the urge of the main spring of the typewriter. However, the clearance between the trailing portion of the tooth on the opposite edge of the slot is still greater due to the fact that the slots diverge downwardly.

It will also be noted that as an engaged tooth becomes disengaged from a rack web or tooth, the succeeding pinion tooth engages a succeeding rack tooth, and the correction is automatically made due to the fact that the main spring of the typewriter is constantly urging the engaged tooth of the rack into engagement with a tooth 40 of the pinion.

Figures 2, 3:
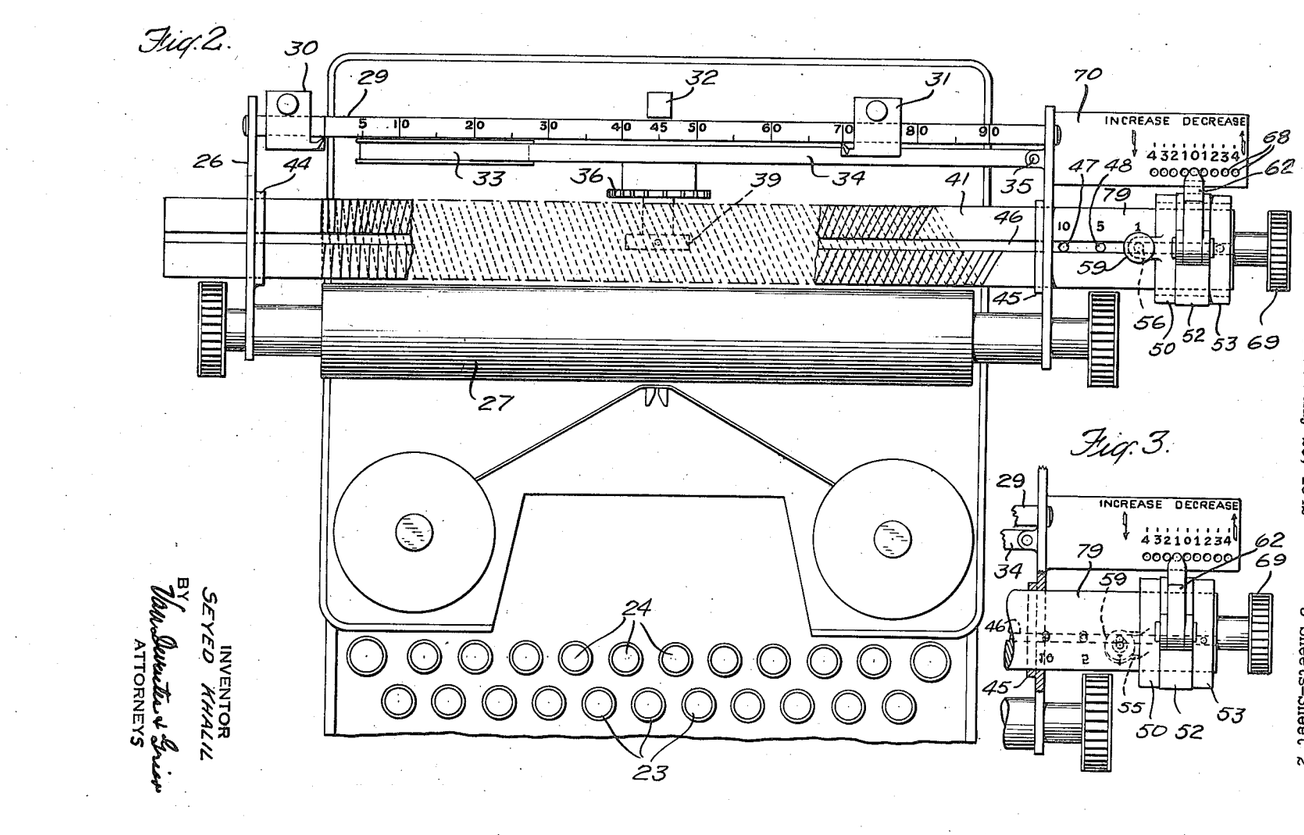
Figure 2 is a plan view of the typewriter shown in Figure 1, wherein details of the continuously variable pitch rack and the visual indicators for use in line justifying are shown.
Figure 3 is a view showing the visual indicators of Figure 2, set for increasing the typing intervals of a line under conditions to be presently described.

Referring now to Figure 2, it will be noted that the pinion meshes with the variable pitch rack (which in that figure is tubular or cylindrical) beneath and on the longitudinal center line of the rack, and when the lever 62 engages the "0" point on the visual indicator 70, the teeth lie on the "tens" or normal pitch line.

The longitudinal setting of the rack (which is lateral with respect to the paper on the platen) is made in accordance with the position of the left marginal stop 30 with respect to the marginal rack 29. For example, in Figure 2 the left marginal rack 30 is set on "1," therefore the rack 41 must be set to such a position that the plunger 56 engages a hole numbered "1" on the visual indicator 79. This is done by grasping the knob 59 with the left hand and raising the plunger 56 to disengage it from any hole in the slot 46 with which it is engaged; then with the right hand the knob 60 is grasped and the rack is moved longitudinally until the desired hole in the slot 46 is in line with the plunger 56; then the knob 59 may be released to allow the plunger 56 to engage the desired hole. In Figures 2 and 3, the plunger is shown in engagement with the "1" hole in the slot 46.

In Figure 4, however, the left marginal stop 30 is set at "5" on the marginal rack 29, therefore, the variable pitch rack 41 is set to a point where the plunger 56 engages the hole numbered "5" on the visual indicator 79.

It will be understood that these setting are made while the stud 67 on the lever 62 is in engagement with the "0" hole on the visual indicator 70, (see Fig. 5).

INCREASING AND DECREASING THE NUMBER OF INTERVALS IN A LINE

To increase the number of intervals in a line of a given length, the magnitude of the intervals must be decreased so that a greater number of intervals will equal said given length.

To decrease the number of intervals in a line of a given length, the magnitude of the intervals must be increased so that the sum of their lengths will be equal to the said given length.

Any increase or decrease of the number of intervals in a line must be in terms of total units, instead of fractional units. Within the capacity of the variable pitch rack, certain limits are involved; for example, if a line is comprised of ten typing intervals, the number of intervals can only be increased or decreased by one. The rack normally engages the pinion on its "ten" pitch line, therefore to increase the intervals by one, the rack is rotated to bring the "eleven" pitch line into engagement with the pinion. This results in reducing the magnitude of the intervals so that eleven intervals equals the length of ten intervals.

A ten interval line cannot be increased by two intervals. In other words, in the arrangement shown in the drawings, the ten interval line cannot be increased to twelve intervals. It must, however, be understood that the variable pitch rack can be constructed to take care of such conditions, as well as many other conditions, without departing from the spirit of the invention, as the forms herein shown and illustrated are given by way of example only.

If the line had twenty intervals instead of ten, it can, with the arrangement illustrated, be increased either one or two intervals.

Figure 11:
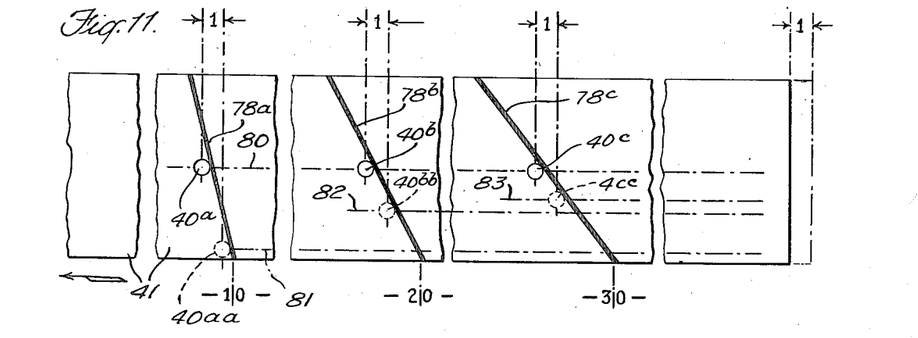
Figure 11 is a diagrammatic view showing the shifting of the rack one typing interval for lines containing different numbers of typing intervals.

In Figure 11 is shown diagrammatically the movement of the rack 41 when lines containing several intervals (for example ten, twenty, or thirty intervals) are increased by one interval.

Figure 12:
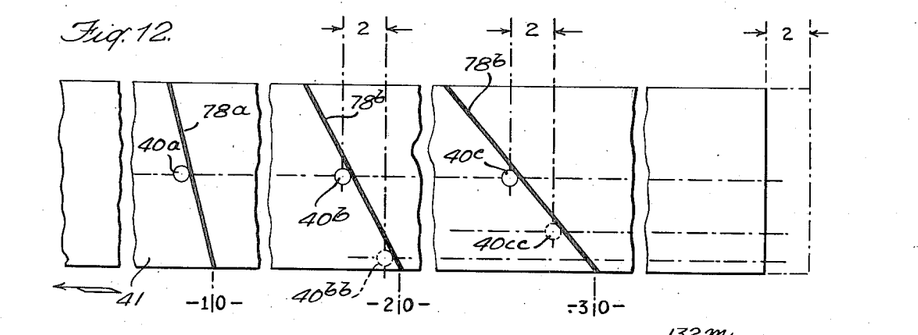
Figure 12 is a view similar to Figure 11, illustrating the movement for a change of two typing intervals in lines containing different total typing intervals.

In Figure 12 the movement of the rack 41 is shown diagrammatically for increasing lines of several intervals by two intervals, for example lines containing ten, twenty, or thirty intervals. However, in this instance it is shown that a line containing ten intervals cannot be increased by two intervals.

In Figure 11 the heavy black line 78$^a$ represents the edge of the rack web or tooth in the position corresponding to ten typing intervals. This is held in engagement with the tooth of the pinion, represented by the numeral 40$^a$, by the main spring of the typewriter.

Now, to increase the typing intervals by one interval, the relative position of the tooth 40$^a$ with respect to the surface 78$^a$ is equivalently indicated in dotted lines and designated by the numeral 40$^{aa}$.

Due to the slight angularity of the web 78$^a$, the rotary movement of the rack is substantially greater than is the case where the line includes greater numbers of typing intervals. This relative movement is comparable to the distance between the dot-dash lines 80 and 81.

At the end of a twenty interval line, the engaged face of the rack web or tooth is represented by the heavy line 78$^b$, and the pinion tooth engaging the same is represented by the numeral 40$^b$. To increase the twenty interval line by one interval, the relative position of the tooth 40$^b$ with respect to the surface 78$^b$ is equivalently indicated in dotted lines designated by the numeral 40$^{bb}$.

Due to the fact that the inclination of the web or tooth 78$^b$ is greater at the twenty interval position, the movement is proportionate to the distance between the dot-dash lines 80 and 82.

At the end of a thirty interval line, the engaged face of the rack web or tooth is represented by the heavy line 78$^c$, and the pinion tooth engaging the same is represented by the numeral 40$^c$. To increase the thirty interval line by one interval, the relative position of the tooth 40$^c$ with respect to the surface 78$^c$ is equivalently indicated in dotted lines designated by the numeral 40$^{cc}$.

Due to the fact that the inclination of the web or tooth 78$^c$ is still greater at the end of the thirty interval position, the movement is proportionate to the distance between the dot-dash lines 80 and 83.

Although the movements 80—81, 80—82, and 80—83 all vary as above described, the longitudinal movements for each condition are all equal to one typing interval.

In Figure 12, it will be seen that two typing intervals cannot be added to the ten interval line, due to the fact that the inclination of the rack tooth 78$^a$ is too steep. However, in the twenty interval line, the movement is equivalent to the difference between the relative positions 40$^b$ and 40$^{bb}$; and in a thirty interval line, equivalent to the difference between the positions 40$^c$ and 40$^{cc}$.

Due to the fact that the inclination of the rack tooth 78$^b$ is steep, and the inclination of the rack tooth 78$^c$ is yet of a greater steepness, the rotative movement is greater for the thirty interval line than for the twenty interval line. However, in each instance the longitudinal movement is equal to two intervals.

It must be understood that Figures 11 and 12 are purely diagrammatic and that the pinion teeth do not move from the solid positions to the dotted positions, instead the rack is rotated. The relative movements however are shown diagrammatically in these figures so that a clearer understanding of the action may be had.

In Figures 8, 9 and 10, the rack 41 is unrolled or flattened out so that the full length of all of the teeth or webs may be seen. In alignment with a portion of the rack is shown the marginal rack 29. The left marginal stop 30 is shown as set at the end of the first typing interval; and the right marginal stop 31 is shown as set at the end of the tenth typing interval; and the carriage is in such position that the right marginal stop has brought it to a halt by encountering the engaging member 32.

It is assumed that the numbered graduations on the marginal rack represent the center lines of the typing intervals. The tooth 40 is shown in engagement with the rack teeth 74$^j$. It is assumed that the parts are in the positions shown in Figure 8 at the end of a ten interval line. Assuming that the succeeding line is to include only nine typing intervals, that, therefore, the magnitude of each of the typing intervals metered out by the escapement must be increased so that the total length of the nine intervals will be equal to the length of the preceding ten intervals.

The rack 41, which is in fact cylindrical, is rotated to bring the "nine" pitch line in engagement with the tooth 40. This is equivalent to moving the rack development upwardly from the solid position, shown in Figure 9, to the dot-dash position designated by the numeral 41$^a$ shown in Figure 9, and after this operation the relative positions of the parts are equivalent to those shown in Figure 10.

The next step is to return the carriage to bring the left marginal stop 30 against the engaging member 32, in which event the pinion tooth 40, indicated by the dotted circle 40$^x$, is engaging the rack tooth 74$^a$.

Each typing interval will, therefore, be increased one-ninth, and the center lines of these intervals will be proportionate to the scale 84 shown in dot-dash lines at the bottom of Figure 10. This scale is placed in parallel relation to the marginal rack 29, so that a comparison between the magnitudes of the nine typing intervals and the ten typing intervals may be made.

This operation may be visualized as follows:

Referring to Figure 2, it will be noted that the left marginal stop 30 is set at "1." Now, in order to set the right marginal stop at "10," the carriage would first have to be moved to the right to bring the "10" indication to the right of the engaging member 32, following which the right marginal stop 31 can be set at "10." The plunger 56 is already shown in engagement with the "1" on the visual indicator 79, so this need not be moved. However, if the plunger were in engagement with some other hole than that in line with the "1," it would have to be moved to the "1" position.

The magnitudes of the nine intervals must be increased in length so that they will total the length of ten intervals. Therefore, the lever 62 is disengaged from the "0" hole in the visual indicator 70, and the rack is turned in a counter-clockwise direction by means of the knob 69 until it moves to the left to a point where it engages the "1" position under the word "Increase"; this position is shown in Figure 3. This is done when the right marginal stop 31 is in engagement with the engaging member 32.

After making this setting, the carriage is returned to bring the left marginal stop against the engaging member 32, and the operator is then ready to type the nine intervals, and these nine intervals will occupy a length equal to ten normal intervals.

The act of rotating the rack causes the slot 46 and the tubular member 50 to move from their normal positions shown in Figure 2. The new positions of these parts are with the pinion engaging the rack along the nine pitch line 73. With a twenty interval line, the movement of the rack is half as much, and with a thirty interval line the movement would be one-third as much (see Figure 12).

In Figure 4, it will be noted that the left marginal stop 30 is set at "5," and the right marginal stop 31 is set at "45." This defines a line of forty typing intervals. Assuming that a line is encountered which includes forty-one intervals, it would be necessary to decrease the typing intervals so that forty-one intervals would be equal to the length of forty normal intervals.

The plunger 56 is shown as engaging the "5" hole on the visual indicator 79, which corresponds to the setting of the left marginal stop 30. Now, to decrease the typing intervals so that forty-one of them will be equal to forty standard intervals, the lever 62 is raised to disengage it from the "0" hole on the visual indicator 70, and the rack is then rotated so that the lever 62 can engage the "1" hole under the word "Decrease." This is, of course, done while the right marginal stop 31 is in contact with the engaging member 32. Following this, the carriage is returned to bring the stop 30 against the engaging member 32, and the operator may then type the forty-one interval line and have it come out the same length as a standard forty interval line.

It has been pointed out above that the lateral movement, which is recorded and registered by the visual indicator 70, is always unitary. On the other hand, the rotary movement of the rack in making a setting varies in accordance with which tooth of the rack engages the pinion. In setting the visual indicator 70 for a wanted lateral movement, the extent of rotary movement is automatically taken care of and depends upon the angularity of the tooth engaged by the pinion.

For instance, if the tenth tooth of the rack, for example, is in engagement with the pinion, the rack has to be rotated in either direction to the extreme end of its tooth in order to register one unit of lateral movement; whereas, if the 30th tooth is in engagement with the pinion, the rack has to be rotated in either direction substantially one-third the distance to the extreme end of its tooth to register one unit of lateral movement (see Figure 11).

However, in each of these examples 1½ of a normal unit of lateral displacement is divided equally among all teeth preceding the engaged tooth in the rack.

In the examples given above, even numbers of typing intervals have been referred to—for example, 10, 20 and 30— but it must not be taken to mean that these even numbers of intervals are the only ones which will work. The device works with any number of intervals whether they be even or odd. For example, if the 14th tooth engages the pinion, and the rack is advanced one lateral movement, 13 typing intervals will occupy a line equal to 14 normal typing intervals.

In the modification described above, the variable pitch rack 41 is cylindrical in form and it may be, as above described, formed on a cylindrical member, for example by milling; and the milling cutter would begin at the slot 46ª, which is an extension of the slot 46 previously described, and as the cylinder 41 is rotated to generate the slot being formed, the tool "runs out" in the slot 46ª.

Where the variable pitch rack is formed of a punching and thereafter rolled up, the space occupied by the slot 46ª could be equally divided between the abutting edges of the rolled-up cylindrical rack, this material would form webs at the beginning and ends of the slots formed in the sheet material of which the rolled-up rack is formed.

Figure 14:
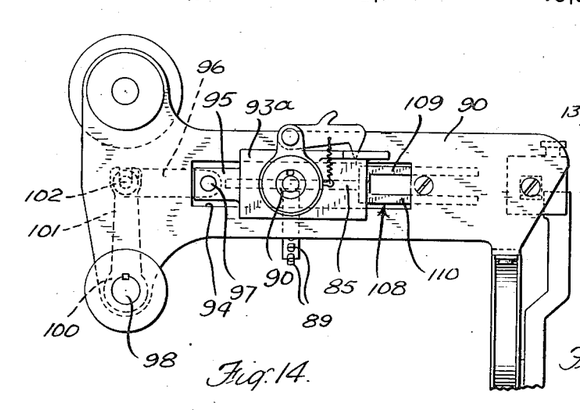
Figure 14 is a right end elevation of the modification shown in Figure 13.

The modification shown in Figures 13 and 14 contemplates the forming of the rack in a flat sheet of material and leaving it flat. This rack is designated by the numeral 85, the slots being designated by the numeral 86, and the webs therebetween forming the teeth of the rack are designated by the numeral 87. The pinion 88 is similar to the pinion 39 shown in Figure 2, and one tooth 89 of the pinion is shown between the webs 87ª and 87ᵇ.

The carriage 90 is urged toward the left, as viewed in Figure 13, by the spring drum 91 through the connecting tape 92, therefore the left edge of the web 87ᵇ is in contact with the pinion tooth 89.

The rack 85 has an extension shaft 126 on one end thereof, and a second extension shaft 127 at the other end thereof in alignment with the first extension shaft. The shaft 126 is journaled in a bearing block 93, and the shaft 127 is journaled in a bearing block 93ª. The bearing block 93ª is slidably mounted in the frame 90, a rectangular slot 94 permitting the bearing block 93ª to slide back and forth therein. The bearing block 93ª has an extension 95 to which a link member 96 is pivotally connected by means of a pivot pin 97.

A shaft 98 is journaled in the frame 90 and has keyed to one end thereof a knob 99. An arm 100 has its lower end keyed to the shaft 98, and has its upper end 101 pivotally connected to the link 96 by means of a pivot pin 102.

The bearing block 92 is mounted in the frame 90 in the same manner so that it also may slide back and forth. A link 103, similar to the link 96, is pivotally connected to an extension 104 of the bearing block by means of a pivot pin 105 and is pivotally connected to the upper end of an arm 106 keyed to the shaft 98 by means of a pivot pin 107.

Thus when the knob 99 is rotated in either direction, the bearing blocks 93 and 93ª move along the frame in their slots (one of which is shown at 94 in Figure 14). The rack plate 85 also has secured thereto a yoke 108 having parallel sides 109 and 110, which form a working fit on the rod 111, which is secured to the frame 90 by means of screws 112. The yoke 108 "rides" the rod 111, and therefore keeps the rack in a horizontal plane at all times.

A bar 112 mounted on the carriage carries a graded scale and is provided with slidable stops 113 and 114,—113 being the left marginal stop and 114 the right marginal stop. These marginal stops are settable along said scale and adapted to be engaged and stopped by an engaging member 115 on the frame 116 of the typewriter.

The shaft 127 has a longitudinal slot 117 formed therein, similar to the slot 46 shown in the first modification. A member 118 carried on the shaft 127 includes a plunger 119 similar to the plunger 56 shown in Figure 6, and this knob may be set to engage holes 120 in the bottom of the slot 117 in accordance with the setting of the left marginal stop 113. The holes 120 may be numbered and may constitute a visual indicator 121, similar to the visual indicator 79 shown in Figure 4.

The member 118 carries a lever 122 similar to the lever 62 shown in Figures 5 and 6. A plate member 123 mounted on the bearing block 23, and movable therewith, carries a plurality of holes 124 to be engaged by the lever 122. These holes are numbered and together with their numbers they constitute a visual indicator 125. The lever 122 normally engages the zero hole on the visual indicator 125.

Now, suppose a line containing 22 typing intervals has been typed, and the next line to be added includes 21 typing intervals; it is necessary to increase the typing intervals so that 21 intervals will occupy the space of a line of the same length as the 22 interval line. In that case, the setting would be accomplished as follows: The lever 122 would be lifted to disengage it from the zero hole on the visual indicator 125, and the knob 99 would be rotated in the direction of the arrow. This would cause the rack 85 to be moved upwardly, as viewed in Figure 13; but since the tooth 89 of the pinion is fixed, the rack will move angularly or parallel to the left edge of the web or rack tooth 87 which is engaged by the pinion tooth 89. The result of this movement is upwardly and to the left, and the support 118 of the lever 122 is in turn moved toward the left. The knob 99 may be turned until the lever 22 engages the hole under the "1." After obtaining this setting, the 21 interval line may then be typed and it will come out the same length as the 22 interval line.

Thus it will be seen that the number of typing intervals by the action just described is decreased by "one." Obviously, if the number of typing intervals in a given line are decreased by one, and the resultant line is the same length as the first line mentioned, each typing interval is increased so that the total of 21 intervals measures up to the same length as the original 22 intervals. In this modification, as well as the one previously described, any number of intervals may be justified whether they be odd or even.

A further modification contemplates the forming of a constantly variable pitch segmental gear adapted to function as a pinion and a constantly variable rack adapted to cooperate therewith. The development of the constantly variable pitch segmental gear is shown in Figure 15 and designated by the numeral 130. It may be stamped from sheet stock with a plurality of slots 131 formed therein.

The webs 132 between these slots form the teeth of the segmental gear. The number of teeth in the segmental gear is preferably equal to the number of teeth in the rack (which will presently be described), so that as the carriage moves along the frame, the length of its longest possible line, the segmental gear will make almost a complete revolution.

The reason this segmental gear does not make one or more than one complete revolutions is that the tooth at one end of the rack has a minimum of convergence, and the tooth at the other end of the rack lies along the line of greatest convergence, and it would not be practical to step from one to the other when the end of the rack is reached.

The development of the rack 133 is shown in Figure 16. A plurality of slots 134 of various degrees of convergence are formed therein, and the webs 135 therebetween form the teeth of the rack.

It will be noted that in the segmental gear 130 the open slots 131 are all of uniform width, whereas the webs or teeth 132 therebetween taper. For example, the end 132ᵃ of the tooth is substantially narrower than the end 132ᵇ. In the rack, it will be noted that the teeth or webs 135 are uniform in width and that the slots 134 taper, the end 134ᵃ of a slot being substantially narrower than the end 134ᵇ. This enables the tapering teeth of the segmental gear to mesh with the rack.

The development or plate 130 of this segmental gear is rolled up to form a tube by bringing the ends 130ᵃ and 130ᵇ upwardly, as viewed in Figure 15 (around a suitable mandrel, for example) until the edges 130ᵃ and 130ᵇ are in contact with or abut each other.

Likewise, the rack blank or plate 133 is rolled up to form a tube by bringing the edges 133ᵃ and 133ᵇ upwardly, as viewed in Figure 16 (around a suitable mandrel, for example) until the edges 133ᵃ and 133ᵇ are in contact with or abut each other.

Figure 17:
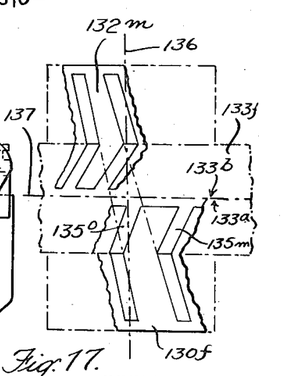
Figure 17 is a diagrammatic representation of the variable pitch rack and variable pitch pinion in engagement with each other.

The formed segmental gear is designated in Figure 17 by the numeral 130ᶠ, and its axis is designated by the numeral 136. The rack in Figure 17 is designated by the numeral 133ᶠ.

The axis of the rack is designated by the numeral 137 and is at right angles to the axis 136. The segmental gear tooth 132ᵐ is shown engaged by the rack teeth 135ᵐ and 135ᵒ. To change the pitch along the line of engagement, the rack 133ᶠ may be rotated in the manner described above for the other modifications, and the segmental gear 130ᶠ may be moved axially.

Although I have described a preferred form of the invention and modifications thereof, it is obvious that many changes may be made in the arrangements herein shown and described without departing from the spirit as set forth in the following claims.

What is claimed is:

1. In a typewriter, a frame, a carriage movable in intervals along said frame as the typing progresses, an escapement, means connecting said carriage to said escapement, said means including a rack having slot openings angularly disposed with respect to one another, the webs therebetween forming teeth having parallel sides whereby the pitch of the teeth along one pitch line is different from the pitch along any other pitch line thereof, and settable means controlling said first-mentioned means for increasing or decreasing the magnitude of said intervals.

2. In a typewriter, a frame, a carriage movable in intervals along said frame as the typing progresses, an escapement, a rack and a pinion, at least one of which constitutes a member having teeth therein inclined with respect to one another with equal angles between adjacent teeth whereby the pitch on any pitch line is different from the pitch along any other pitch line, said rack and pinion being between said carriage and said escapement, and settable means controlling said member for changing the magnitude of said intervals.

3. In a typewriter, a frame, a carriage movable in intervals along said frame as the typing progresses, an escapement, a pinion for driving to said escapement, a rack movably carried on said carriage, said rack having slots formed therein and angularly disposed with respect to one another, the webs therebetween forming teeth having parallel sides, whereby the pitch of the latter along a given pitch line is different from the pitch along any other pitch line thereof, said pinion engaging said rack along a normal pitch line, and settable means connected to said rack for moving the same and causing it to be engaged by said pinion on different pitch lines.

4. In a typewriter, a carriage movable in intervals along said frame as the typing progresses, an escapement on said frame, a segmental gear for driving said escapement, said gear having teeth inclined with respect to one another and the spaces or slots bounded by said teeth having sides parallel to each other, whereby the pitch on any pitch line is different from the pitch along any other pitch line thereof, a rack carried on said carriage, said rack having teeth capable of meshing with any pitch line of said segmental gear and normally engaging the latter on a given pitch line thereof, and settable means for changing the relation of said rack and said segmental gear and causing them to mesh on a different pitch line.

5. In a typewriter, a carriage movable in intervals along said frame as the typing progresses, an escapement on said frame, a segmental gear having teeth inclined with respect to one another and the spaces or slots bounded by said teeth having sides parallel to each other, whereby the pitch of any pitch line is different from the pitch along any other pitch line thereof, a rack movably carried on said carriage, said rack having slot openings angularly disposed with respect to one another, and webs therebetween forming teeth having parallel sides, whereby the pitch of the teeth along one pitch line is different from the pitch along any other pitch line thereof, the teeth of said rack and said gear being normally engaged on a given pitch line, and settable means for changing the relation of said rack and gear and causing them to be engaged on a pitch line different from said given pitch line.

6. In a typewriter, a frame, a carriage movable in intervals along said frame as the typing progresses, an escapement, a pinion for driving said escapement, a rack of circular cross section having slot openings angularly disposed with respect to one another, and webs therebetween forming teeth having parallel sides, whereby the pitch of the teeth along one pitch line is different from the pitch along any other pitch line thereof, journals in said carriage rotatably carrying said rack, means partly on said rack and partly on said frame for normally holding said rack against movement in said journals, said means normally maintaining said rack in engagement with said pinion along a given pitch line and adapted to be moved to effect the engagement of said pinion with said rack along a different pitch line.

7. In a typewriter, a frame, a carriage movable in intervals along said frame as the typing progresses, a scale on said carriage, a left marginal stop settably carried on said scale, a right marginal stop also settably carried on said scale, and a stationary member on said frame adapted to be engaged by said stops, an escapement, a pinion for driving said escapement, a rack of circular cross section having slot openings angularly disposed with respect to one another and webs therebetween forming teeth having parallel sides, whereby the pitch of the teeth along one pitch line is different from the pitch along other pitch lines thereof, journals in said carriage rotatably carrying said rack, means partly on said rack and partly on said frame for normally holding said rack against movement in said journals, said means normally maintaining said rack in engagement with said pinion along a given pitch line and adapted to be moved to effect the engagement of said pinion with said rack along a different pitch line, and settable means including a visual indicator for initially adjusting said rack in accordance with the setting of said left marginal stop.

8. In a typewriter, a frame, a carriage movable in intervals along said frame as the typing progresses, a scale on said carriage, a left marginal stop settably carried on said scale, a right marginal stop also settably carried on said scale, and a stationary member on said frame adapted to be engaged by said stops, an escapement, a pinion for driving said escapement, a rack of circular cross section having slot openings angularly disposed with respect to one another and webs therebetween forming teeth having parallel sides, whereby the pitch of the teeth along one pitch line is different from the pitch along other pitch lines thereof, journals in said carriage rotatably carrying said rack, settable means for moving said rack axially in said journals to correspond with the position of said left marginal stop, means partly on said rack and partly on said settable means for normally holding said rack against movement in said journals, said last-recited means normally maintaining said rack in engagement with said pinion along a given pitch line and adapted to be moved to effect the engagement of said pinion with said rack along a different pitch line.

9. In a typewriter, a frame, a carriage movable in intervals along said frame as the typing progresses, a scale on said carriage, a left marginal stop settably carried on said scale, a right marginal stop also settably carried on said scale, and a stationary member on said frame adapted to be engaged by said stops, an escapement, a pinion for driving said escapement, a rack of circular cross section having slot openings angularly disposed with respect to one another and webs therebetween forming teeth having parallel sides, whereby the pitch of the teeth along one pitch line is different from the pitch along other pitch lines thereof, journals in said carriage rotatably carrying said rack, settable means for moving said rack axially in said journals and including a visual indicator calibrated in terms of said scale, whereby said rack may be set to correspond with the position of said left marginal stop, means partly on said rack and partly on said settable means for normally holding said rack against movement in said journals, said last-recited means normally maintaining said rack in engagement with said pinion along a given pitch line and adapted to be moved to effect the engagement of said pinion with said rack along a different pitch line.

10. In a typewriter, a frame, a carriage movable in intervals along said frame as the typing progresses, a scale on said carriage, a left marginal stop settable on said scale, and a stationary member on said frame adapted to be engaged by said stop, an escapement, rack and pinion means between said carriage and said escapement, settable means for changing the point of engagement of said rack and pinion axially and including a visual indicator calibrated in terms of said scale, whereby settings of said point of engagement may be made to correspond to the position of said left marginal stop, and means to increase or decrease the magnitude of said intervals.

11. In a typewriter, a frame, a carriage movable in intervals along said frame as the typing progresses, an escapement, a pinion for driving to said escapement, a member slidably mounted in one end of said carriage, a second member slidably mounted in the other end of said carriage, actuating means for said members, said actuating means being adapted to move said members in parallel relation, journals in each of said members in alignment with each other, a plate having extensions on each end thereof engaged in said journals, means associated with said plate for maintaining the same in a given plane on said carriage, a plurality of slots formed in said plate angular with respect to the longitudinal axis of said plate and diverging with respect to each other, the webs between said slots forming teeth of uniform width, said plate constituting a rack, said pinion being normally meshed with said rack along a given pitch line, and locking means associated with said rack and adapted to be released when said rack is to be moved to effect its engagement with the pinion on a different pitch line.

12. In a typewriter, a frame, a carriage movable in intervals along said frame as the typing progresses, an escapement, a pinion for driving to said escapement, a plate having extensions on each end thereof, a plurality of slots formed in said plate angular with respect to the longitudinal axis of the plate, said slots each diverging with respect to the others, the webs between said slots being of uniform width and forming teeth and constituting a rack, having a plurality of pitch lines lying parallel to the longitudinal axis of said plate, a pair of journals on said carriage supporting said extensions, yoke means for maintaining said plate in a given plane on said carriage, said pinion being normally meshed with said rack along one of said pitch lines, and means for moving said journals on the frame of said carriage in parallel relation to each other, thereby moving said plate to effect its engagement with the pinion along a different pitch line.

13. A typewriter according to claim 12, wherein one of said extensions carries a boss, a lever pivoted on said boss, a plate carried by the journal supporting said last-mentioned extension, and a visual indicator on said plate graduated in terms of said intervals and including depressions adjacent to each graduation and adapted to be engaged by said lever.

14. In an escapement control typewriter or the like, means to justify the right and left margins of matter to be written therein, said means including a positionable rack, the teeth of which constitute webs of uniform width between a plurality of slots inclined with respect to each other, the pitch along any pitch line of said rack being different from the pitch along any other pitch line thereof, said escapement having connected thereto a pinion normally engaging said rack on a given pitch line, and means to selectively move said rack for bringing other pitch lines into engagement with the teeth of said pinion.

15. In a typewriter, an escapement rack comprised of a member of circular cross-section and having a plurality of slots formed therein, each of said slots being angular with respect to its neighbor, the webs between said slots forming teeth of uniform width and the distance therebetween increasing circumferentially of the rack, thereby imparting to said rack a plurality of pitch lines longitudinal of said rack.

16. In a typewriter, an escapement rack comprised of an elongated member having a plurality of slots formed therein, said slots being angular with respect to the longitudinal axis of said member, center lines of said slots also being angular with respect to each other, whereby the pitch or spacing thereof is greater, along the longitudinal line crossing one end of each of said slots, than the pitch or spacing thereof along a second longitudinal line crossing the opposite ends of said slots.

17. In a typewriter, an escapement rack comprised of an elongated member having a plurality of engaging units formed therein, said units being angular with respect to the longitudinal axis of said member, center lines of said units also being angular with respect to each other, whereby the pitch or spacing thereof is greater, along the longitudinal line crossing one end of said units, than the pitch or spacing thereof along a second longitudinal line crossing the opposite ends of said units.

18. In a typewriter, a helicoidal escapement rack, the teeth of which are continuously variable both in pitch and in lead, said teeth constituting webs of uniform width between slots or openings each inclined with respect to all others and all tapering circumferentially in the same direction, whereby the pitch along any pitch line is different from the pitch along any other pitch line thereof.

19. In a typewriter, a cylindrical rack having a plurality of tapering slots formed therein, each slot having its axis angularly disposed with respect to all of the others and all said axes being inclined with respect to the longitudinal axis of said rack, the webs between said slots forming engaging units or teeth of uniform width throughout, whereby the pitch of any longitudinal pitch line is different from the pitch on any other longitudinal pitch line, a carriage on said typewriter, and means on said carriage rotatably supporting said rack, pinion means meshing with said rack, and means engaging said rack for rotatably setting said rack to engage said pinion along a different pitch line.

SEYED KHALIL.